United States Patent Office.

EDWARD BEANES, OF LONDON, ENGLAND.

*Letters Patent No. 61,917, dated February 12, 1867.*

IMPROVED MODE OF TREATING SACCHARINE MATTERS.

*The Schedule referred to in these Letters Patent and making part of the same.*

TO ALL WHOM IT MAY CONCERN:

Be it known that I, EDWARD BEANES, of No. 26 Priory Road, Kilburn, London, in the county of Middlesex, in the United Kingdom of Great Britain and Ireland, have invented a certain new and useful "Improved Mode of Treating Saccharine Matters;" and I do hereby declare that the following is a full, clear, and exact description of the same, which will enable others skilled in the art to fully understand and make use of the same.

I submit sugar, either in a dry or moist state, or in solution, to the action of ozone, and either with or without pressure, until such sugar, sirup, molasses, or other saccharine solution, is decolorized to the desired point. To effect this object, it is not necessary that the ozone should be absolutely pure, though, should it be desirable to use pure ozone, it may be obtained, as is well known, by passing dry oxygen gas through an ozone tube, in connection with an induction coil and galvanic battery, or by various other means. I only find it necessary for my object to pass atmospheric air, previously dried and purified, or not, instead of oxygen, through the ozone tube, as above explained, and from which the ozone is conveyed by a pipe to a vessel containing the sugar, sirup, molasses, or other saccharine solution to be acted upon. When it is desirable to act on dry or moist sugar, the sugar may be placed in a deep vessel, having a perforated plate near the bottom; the ozone may be forced into the compartment between the bottom of the vessel and the perforated plate, and, finding its way upwards through the sugar, it will produce the desired decolorizing action and the residue will escape at the top of the vessel; this or any other convenient means may be used. For sirup, molasses, or other saccharine solution, a similar vessel to the above may be used, but in some cases it would be preferable, to keep the solution warm, also to partially fill the vessel with animal charcoal, or other granular substance, so that the ozone may be brought more effectually into contact with the liquid to be acted upon and decolored. For evaporating saccharine solutions in general, I prefer to dry the air by passing it through sulphuric acid or chloride of calcium before it is passed through the ozone tube, and also to keep the solutions to be evaporated at a temperature not exceeding 212° Fahrenheit; this may be effected in any known manner, as, for instance, either by means of a double bottom to the vessel, or by means of pipes through which hot water or vapor of the required temperature is made to circulate. It is desirable that the evaporating vessel should be rather shallow. The ozone is introduced in the lower part of the liquid by means of a perforated pipe or pipes, or a perforated double bottom. By these means evaporation proceeds rapidly, and at the same time the solution is much decolored, and the formation of glucose is to a very considerable extent prevented.

I do not claim any particular class or form of apparatus or vessels; neither do I claim any particular mode of producing ozone, nor any particular temperature at which the material or solution should be maintained during its treatment; but what I do claim, and desire to secure by Letters Patent, is—

Subjecting saccharine matters to the action of ozone, substantially as and for the purpose described.

In testimony whereof I have signed my name to this specification in the presence of two subscribing witnesses.

EDWARD BEANES.

Witnesses:
BRISTOW HUNT, *Solicitor and Patent Agent,* 1 *Serle Street, Lincoln's Inn, London.*
R. MORGAN, *Clerk,* 1 *Serle Street, London.*